(12) United States Patent
Al-Hader

(10) Patent No.: US 10,024,962 B2
(45) Date of Patent: Jul. 17, 2018

(54) SYSTEM AND METHOD FOR POLYTHENE INFRASTRUCTURE MONITORING

(71) Applicant: Abu Dhabi Water & Electricity Authority (ADWEA), Abu Dhabi (AE)

(72) Inventor: Mahmoud Fawzi Abdullah Al-Hader, Al Ain (AE)

(73) Assignee: Department of Energy, Abu Dhabi (AE)

( * ) Notice: Subject to any disclaimer, the term of this patent is extended or adjusted under 35 U.S.C. 154(b) by 161 days.

(21) Appl. No.: 14/802,352

(22) Filed: Jul. 17, 2015

(65) Prior Publication Data

US 2015/0323655 A1 Nov. 12, 2015

Related U.S. Application Data

(63) Continuation-in-part of application No. 14/093,606, filed on Dec. 2, 2013, now Pat. No. 9,207,325.

(60) Provisional application No. 61/733,494, filed on Dec. 5, 2012.

(51) Int. Cl.
| | |
|---|---|
| *G01S 17/02* | (2006.01) |
| *G01C 15/00* | (2006.01) |
| *G01S 17/89* | (2006.01) |
| *G01S 7/48* | (2006.01) |
| *G01S 7/497* | (2006.01) |

(52) U.S. Cl.
CPC .......... *G01S 17/023* (2013.01); *G01C 15/002* (2013.01); *G01S 7/4802* (2013.01); *G01S 17/89* (2013.01); *G01S 7/497* (2013.01)

(58) Field of Classification Search
CPC .. G01S 21/3638; G06T 17/05; G06K 9/00771
See application file for complete search history.

(56) References Cited

U.S. PATENT DOCUMENTS

| | | | |
|---|---|---|---|
| 2010/0036544 A1* | 2/2010 | Mashiach | 701/2 |
| 2013/0103303 A1* | 4/2013 | Lynch | 701/410 |

* cited by examiner

*Primary Examiner* — Luke D Ratcliffe
(74) *Attorney, Agent, or Firm* — Hayes Soloway PC

(57) ABSTRACT

The various embodiments herein provide a method and system for obtaining geospatial data on infrastructure networks. The system comprises mobile laser scanner mounted on top of a vehicle with Global Positioning System, a floating inertial measurement unit and cameras. The method of mobile laser scanning process comprises verifying all components of laser scanning system for their functionality after collecting permissions; performing real data validation of the laser scanner; conducting mobile laser scanning by transmitting and receiving laser pulses; correcting the geometrical errors using GNSS reference data; generating LAS file by combining surveyed laser data and GNSS data; constructing 3D surfaced based model; analyzing the surface model and extracting the layout of polyethylene infrastructure to observe the diameter and shape of the polyethylene pipes using the equation $$S = \frac{Prm \times 726.35}{7708.38}.$$

10 Claims, 12 Drawing Sheets

SYSTEM AND METHOD FOR POLYTHENE INFRASTRUCTURE MONITORING

CROSS-REFERENCE TO RELATED APPLICATIONS

The present application is a continuation of and claims priority under 35 U.S.C. § 120 to prior co-pending U.S. application Ser. No. 14/093,606, filed 2 Dec. 2013, now U.S. Pat. No. 9,207,325, which in turn claims benefit under 35 U.S.C. § 119 to U.S. Provisional Application No. 61/733,494 filed on 5 Dec. 2012, the entirety of both of which is hereby incorporated herein by reference.

BACKGROUND

Technical Field

The embodiments herein generally relate to infrastructure networks. The embodiments herein particularly relates to a method for monitoring infrastructure networks. The embodiments herein more particularly relates to a method and system employing laser pulses for monitoring infrastructure networks.

Description of the Related Art

Over the past few years, several research and development authorities across the world have started the development and support of intelligent city platforms in terms of monitoring and controlling infrastructure networks. The infrastructure network is one of the primary city subsystems. The automation techniques are important to update the huge network with frequent progress interns of new installations, enforcements and replacements. The necessity of the infrastructure progress updates daily is generated due to the criticality of these utility networks to the everyday life of any community.

When a certain user requires electrical or water maintenance due to a service disconnection, the normal workflow is to disconnect the service for all the nearby users due to an inaccurate/incomplete utility data. The service is disconnected for all the nearby users because the location of the exact service cable/pipeline connected to the concerned user is unknown. The reason behind a lack of knowledge regarding the location of the utility services is the difficulty in surveying the daily network utility updates using the current surveying technologies.

The update of current geospatial data progress at the city scale is done by utilizing the normal data collection techniques such as GPS, Total Station and level equipments. The data collection performance by using the available surveying techniques on the city scale is very much limited and complicated due to several factors such as a lack of a proper geodetic network for establishing the needed missions control points before conducting the physical data collection operations. On the other hand, the needed resources are also too huge to operate these techniques in the areas where the accuracy of the data is affected and not consistent due to the large number of resources involved with different quality levels. Several countries conduct the geophysical survey using a Ground Penetrating Radar (GPR) and other similar techniques such as cable detection to update infrastructure utility networks.

The daily updates of the infrastructure networks are very huge due to the new installations, frequent replacements and enforcements that are subject to maintenance and operation on a frequent basis. The efficiency of the maintenance and operation workflow is strongly related to the geographical location of these infrastructure networks. Due to the huge daily updates of the infrastructure networks, the ability of collecting the updated locations using the current geospatial monitoring techniques is very difficult. The monitoring of the infrastructure networks is needed to geospatially locate and update the physical infrastructure development, which significantly enhances the performance of managing and maintaining the infrastructure assets.

Hence there is a need for an efficient system for updating and monitoring the infrastructure networks progress. Also there is a need for an efficient geospatial data updating technique for the infrastructure networks. Further, there is a need for a mathematical method for re-planning the mobile laser scanning missions to obtain the best model for updating the polyethylene infrastructure networks.

The above-mentioned shortcomings, disadvantages and problems are addressed herein and which will be understood by reading and studying the following specification.

OBJECTS OF THE EMBODIMENTS

The primary object of the embodiments herein is to provide an improved system and method for monitoring the infrastructure networks using mobile laser based survey technology.

Another object of the embodiments herein is to provide efficient geospatial data updating system for the infrastructure networks.

Yet another object of the embodiments herein is to provide an analytical analysis method for identifying the most efficient system ground speed to be conducted during the mobile laser scanning missions for pipelines/cables.

Yet another object of the embodiments herein is to provide a system working on any kind of polyethylene infrastructure materials.

Yet another object of the embodiments herein is to provide a mathematical method for re-planning the mobile laser scanning missions to obtain the best model for updating the polyethylene infrastructure networks These and other objects and advantages of the present invention will become readily apparent from the following detailed description taken in conjunction with the accompanying drawings.

SUMMARY

The various embodiments herein provide a method and system for obtaining a geospatial data on the infrastructure networks. The system comprises a mobile laser scanner, a vehicle equipped with Global Positioning System (GPS), a floating/unfixed inertial measurement unit (IMU), and Charge Coupled Device (CCD) cameras. The mobile laser scanners are mounted on top of the vehicle and integrated with complete navigation and orientation platforms. The method for performing a mobile laser scanning process comprises the steps of collecting a relevant permission prior to start the process, verifying all the components of laser scanning system for their functionality, performing a real data validation of the laser scanning system, conducting a mobile laser scanning process by sending the laser pulses and collecting a data from the reflected laser pulses, correcting the geometrical errors in a mobile laser scanning point cloud data using a Global Navigation Satellite Systems (GNSS) reference station data; generating a LAS file by combining the surveyed laser data and the GNSS data;

constructing a 3D surface based model by using the data from the LAS file; analyzing the surface model and extracting a layout of polyethylene infrastructure structures and observing the diameter and shape of the polyethylene pipes using the cross sections of the layout.

According to one embodiment, the orientation and location of the mobile laser scanning system is adopted for defining the position and direction of the system, during the system movement in at-least three directions. The directional accuracy enhances the smoothness of receiving the laser pulses reflects.

According to one embodiment, the system is fully checked before conducting any physical laser-scanning mission due to the high system sensitivity. The IMU navigation unit, data logging configuration, the readiness of the vehicle and all related configuration are well checked before conducting the mobile laser scanning mission.

According to one embodiment, the real data validation is performed after the preliminary verification of the laser scanning mission plan. The data validation is reflected in the positional accuracy and the attitude accuracy degree.

According to one embodiment, the surveying system is immediately initiated once after the position is identified and calculated using the GPS. The IMU unit calculates the orientation angles of the laser emitter components that are fixed inside the scanning/navigation/orientation box.

According to one embodiment, the observed mobile laser scanning point cloud data normally having several geometrical errors in point's position and direction. The GNSS reference station data is adopted for fixing all geometrical errors.

According to one embodiment, the surveyed laser data is combined with the GNSS data in order to generate the LAS file (corrected point cloud data). The LAS file is adopted for build up the 3D surface model and accordingly analyzes the surveyed mission to extract layout of the polyethylene infrastructure pipelines/cables.

According to one embodiment, the system is oriented to monitor the polyethylene infrastructure networks. The polyethylene infrastructure data update is developed mainly by verifying the exposed portion of the polyethylene pipelines/cables, route and the 3D location. These monitoring aspects are measurable by utilizing the cross sections profiles of the polyethylene pipelines/cables. Since the pipeline is consistent and homogenous between any two connections such as tees, reducers, valves, etc., this feature of cross section is adopted in several locations to observe the diameter, shape extent of pipelines where depth might be changed due to physical earth conditions.

The various embodiments herein provide a mathematical method for forming the base for the mobile laser-scanning mission planning. The method is adopted for identifying the most efficient system ground speed to be conducted during the mobile laser scanning missions for pipelines/cables. The reflection of the laser beam varies from material to another due to the differentiation in the materials physical specifications. The method interprets the mobile laser scanning behavior with respect to polyethylene infrastructure networks and accordingly identifies the mobile laser response. The exposed portion of the feature pipeline/cable (exposed perimeter) is the unknown factor in the mathematical method where as the high laser response and the material constant are known factors.

According to one embodiment, the mobile laser system for the polyethylene materials receives 200 pulses per second in positive and negative directions; wherein the system always records the frame ground speed for every 0.02 second. Accordingly there is a gap between the recorded mobile laser pulses (recorded at every 0.005 second) and the frame ground speed (recorded at every 0.02 second). The mobile laser pulses are grouped, filtered and averaged from 0.005 to 0.02 seconds in order to compare the frame ground speed with the mobile laser pulses response at the same point of time. The positivity and negativity of the received mobile laser beam pulses represents the laser beam direction; accordingly all negative values are transferred to absolute values prior to conduct the analytical analysis.

According to one embodiment, prior to analytical analysis of the mobile laser pulse response, the time series are accurately identified. The accurate time series identification is related to the accuracy of identifying the polyethylene location (latitudes and longitudes). The positional accuracy is mainly related to the geometrical correction for field mission locations and the IMU orientation angles (Roll, Pitch and Heading). The geometrical correction of the IMU orientation angles are also related to the geometrical correction of the system reference frame. The system reference frame is corrected using the input correction combined from the GNSS reference station. After correction of the reference frame and the GPS observations, the IMU orientation angles are corrected as well. The geometrical correction of the reference frame, GPS observations and IMU orientation angles are conducted using least square adjustment.

According to one embodiment, the mathematical method for analytical analysis of mobile laser response comprises the steps of: analyzing the IMU observation to interpret the mobile laser beam pulses intensity (which varies from one material to another material) and density (varies from one speed limit to another speed limit) at each point of time; using the timing observation to correlate the mobile laser pulses, location data (such as latitudes and longitudes) and system ground speed; recording these three factors with respect to time; identifying the time interval accordingly; identifying the system ground speed at noted/preset/defined time intervals, laser response at each point of time and ground speed unit; using a correlation data between the system ground speed and the mobile laser response to conclude the highest mobile laser response constant for scanning the polyethylene infrastructure networks; and lastly calculating the most efficient system ground speed by using the exposed pipeline perimeter and the laser response per centimeter for the polyethylene materials.

According to one embodiment, based on the obtained mathematical relationship between the mobile laser pulses behavior for the polyethylene infrastructure materials and the system ground speed, a second order polynomial is adopted for calculating the model regression fitting to the collected data. The quadratic second order polynomial terms reformatted to represent the polynomial relationship between the system ground speed and the mobile laser scanning response is calculated by the equation:

$$MLPI(S) = -aS^2 + bS - c$$

Wherein, MPLI stands for Mobile Laser Pulse Intensity, S stands for ground speed and a, b, c are the coefficients for calculating the model speed value and comparing it with the collected value. First derivative of the polynomial calculates the average rate of change of the mobile laser pulses response with respect of the system ground speed by the equation:

$$MLPI(S)' = -2aS + b$$

Wherein, MLPI (S)' is the first derivative of the polynomial. Second derivative of polynomial is used to calculate the average difference between the rates of change of the tangents lines for each two successive speed units:

$$MLPI(S)''=-2a$$

Wherein, MLPI(S)" is the second derivative of the polynomial.

The MLPI(S)" is measured by calculating the average of each two sequenced mobile laser pulses response at each two sequenced system ground speeds. The rate of change (average at each sequenced mobile laser pulses) is estimated by computing the average of each sequenced system ground speed from 16.0 km/h to 16.9 km/h The average measured laser pulses response=Σ[response at speed of value (i+1)+response at speed of value (i+2)]/2.

The equation for calculating the speed of the mobile laser system is as follows:

$$S = \frac{Prm \times HLPC}{C}$$

Where Prm is the perimeter of a pipeline and is collected from the site by a visual inspection, HLPC is High Laser Pulse Constant, which is the highest possible observed laser response per cm, S is the speed of the mobile unit, and C is a constant.

The HLPC is High Laser Pulse Constant and is calculated by the following steps. At first, all responses of laser pulses observed from the pipeline related speeds are identified. Secondly, all unwanted (error) values due to (laser for dust or laser of objects close to pipeline boundary) are removed to clearly recognize the area where the laser response is totally different. Thirdly, each speed unit is classified with a related laser response. Then the average laser pulse for each speed unit is calculated.

Based on the field experiments conducted, the HLPC value, which is the High Laser Pulse Constant, is 726.35 and Prm value is 175 cm, when the ground speed of S is 16.49 Km/h. Then the value of C is calculated from the above equation and found to be 7708.38.

Hence the speed of the laser mobile unit S is modified as follows.

$$S = \frac{Prm \times 726.35}{7708.38}$$

Where Prm is the perimeter, which is collected from site by a visual inspection.

The system ground speed, exposed surface (perimeter) of the pipeline and the laser response for the polyethylene material can be mathematically correlated, where laser response for polyethylene materials always constant. However the exposed surface of the pipeline is normally different. Practically the large objects (large exposed surface) are better observed, then the there is a relation between the exposed surface of the polyethylene material and the most efficient system ground speed These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
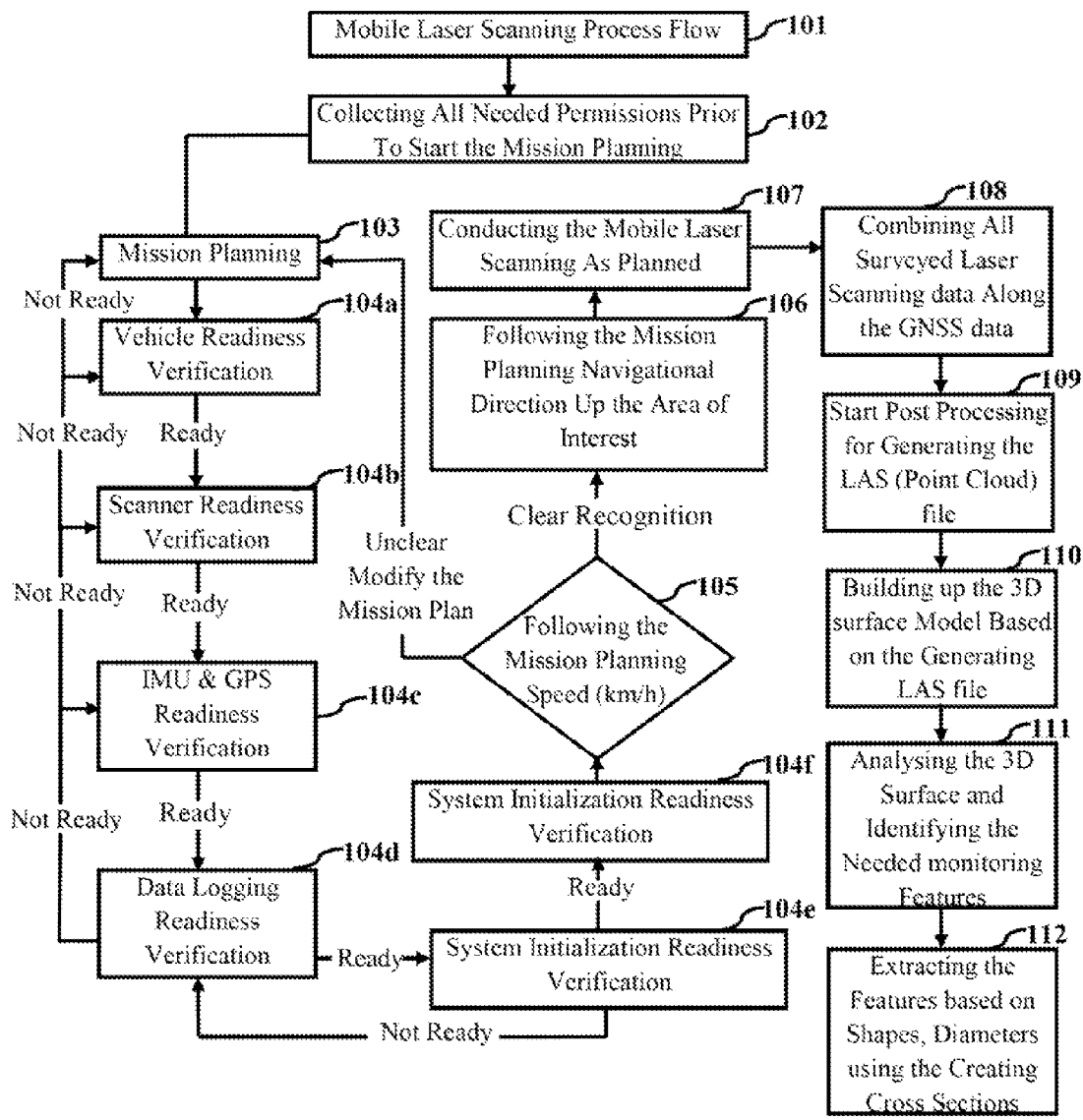
FIG. 1 illustrates a flow chart indicating a method for utilizing mobile laser scanning system, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense The various embodiments herein provide a method and system for obtaining a geospatial data on the infrastructure networks. The system comprises a mobile laser scanner, a vehicle equipped with Global Positioning System (GPS), a floating/unfixed inertial measurement unit (IMU), and Charge Coupled Device (CCD) cameras. The mobile laser scanners are mounted on top of the vehicle and integrated with complete navigation and orientation platforms. The method for performing a mobile laser scanning process comprises the steps of collecting a relevant permission prior to start the process, verifying all the components of laser scanning system for their functionality, performing a real data validation of the laser scanning system, conducting a mobile laser scanning process by sending the laser pulses and collecting a data from the reflected laser pulses, correcting the geometrical errors in a mobile laser scanning point cloud data using a Global Navigation Satellite Systems (GNSS) reference station data; generating a LAS file by combining the surveyed laser data and the GNSS data; constructing a 3D surface based model by using the data from the LAS file; analyzing the surface model and extracting a layout of polyethylene infrastructure structures and observing the diameter and shape of the polyethylene pipes using the cross sections of the layout.

According to one embodiment, the orientation and location of the mobile laser scanning system is adopted for defining the position and direction of the system, during the system movement in at-least three directions. The directional accuracy enhances the smoothness of receiving the laser pulses reflects.

According to one embodiment, the system is fully checked before conducting any physical laser-scanning mission due to the high system sensitivity. The IMU navigation unit, data logging configuration, the readiness of the vehicle and all related configuration are well checked before conducting the mobile laser scanning mission.

According to one embodiment, the real data validation is performed after the preliminary verification of the laser scanning mission plan. The data validation is reflected in the positional accuracy and the attitude accuracy degree.

According to one embodiment, the surveying system is immediately initiated once after the position is identified and calculated using the GPS. The IMU unit calculates the orientation angles of the laser emitter components that are fixed inside the scanning/navigation/orientation box.

According to one embodiment, the observed mobile laser scanning point cloud data normally having several geometrical errors in point's position and direction. The GNSS reference station data is adopted for fixing all geometrical errors.

According to one embodiment, the surveyed laser data is combined with the GNSS data in order to generate the LAS file (corrected point cloud data). The LAS file is adopted for build up the 3D surface model and accordingly analyzes the surveyed mission to extract layout of the polyethylene infrastructure pipelines/cables.

According to one embodiment, the system is oriented to monitor the polyethylene infrastructure networks. The polyethylene infrastructure data update is developed mainly by verifying the exposed portion of the polyethylene pipelines/cables, route and the 3D location. These monitoring aspects are measurable by utilizing the cross sections profiles of the polyethylene pipelines/cables. Since the pipeline is consistent and homogenous between any two connections such as tees, reducers, valves, etc., this feature of cross section is adopted in several locations to observe the diameter, shape extent of pipelines where depth might be changed due to physical earth conditions.

The various embodiments herein provide a mathematical method for forming the base for the mobile laser-scanning mission planning. The method is adopted for identifying the most efficient system ground speed to be conducted during the mobile laser scanning missions for pipelines/cables. The reflection of the laser beam varies from material to another due to the differentiation in the materials physical specifications. The method interprets the mobile laser scanning behavior with respect to polyethylene infrastructure networks and accordingly identifies the mobile laser response. The exposed portion of the feature pipeline/cable (exposed perimeter) is the unknown factor in the mathematical method where as the high laser response and the material constant are known factors.

According to one embodiment, the mobile laser system for the polyethylene materials receives 200 pulses per second in positive and negative directions; wherein the system always records the frame ground speed for every 0.02 second. Accordingly there is a gap between the recorded mobile laser pulses (recorded at every 0.005 second) and the frame ground speed (recorded at every 0.02 second). The mobile laser pulses are grouped, filtered and averaged from 0.005 to 0.02 seconds in order to compare the frame ground speed with the mobile laser pulses response at the same point of time. The positivity and negativity of the received mobile laser beam pulses represents the laser beam direction; accordingly all negative values are transferred to absolute values prior to conduct the analytical analysis.

According to one embodiment, prior to analytical analysis of the mobile laser pulse response, the time series are accurately identified. The accurate time series identification is related to the accuracy of identifying the polyethylene location (latitudes and longitudes). The positional accuracy is mainly related to the geometrical correction for field mission locations and the IMU orientation angles (Roll, Pitch and Heading). The geometrical correction of the IMU orientation angles are also related to the geometrical correction of the system reference frame. The system reference frame is corrected using the input correction combined from the GNSS reference station. After correction of the reference frame and the GPS observations, the IMU orientation angles are corrected as well. The geometrical correction of the reference frame, GPS observations and IMU orientation angles are conducted using least square technique for adjustment.

According to one embodiment, the mathematical method for analytical analysis of mobile laser response comprises the steps of: analyzing the IMU observation to interpret the mobile laser beam pulses intensity (which varies from one material to another material) and density (varies from one speed limit to another speed limit) at each point of time; using the timing observation to correlate the mobile laser pulses, location data (such as latitudes and longitudes) and system ground speed; recording these three factors with respect to time; identifying the time interval accordingly; identifying the system ground speed at noted/preset/defined time intervals, laser response at each point of time and ground speed unit; using a correlation data between the system ground speed and the mobile laser response to conclude the highest mobile laser response constant for scanning the polyethylene infrastructure networks; and lastly calculating the most efficient system ground speed by using the exposed pipeline perimeter and the laser response per centimeter for the polyethylene materials.

According to one embodiment, based on the obtained mathematical relationship between the mobile laser pulses behavior for the polyethylene infrastructure materials and the system ground speed, a second order polynomial is adopted for calculating the model regression fitting to the collected data. The quadratic second order polynomial terms reformatted to represent the polynomial relationship between the system ground speed and the mobile laser scanning response is calculated by the equation:

$$MLPI(S) = aS^2 + bS - c$$

Wherein, MPLI stands for Mobile Laser Pulse Intensity, S stands for ground speed and a, b, c are the coefficients for calculating the model speed value and comparing it with the collected value. First derivative of the polynomial calculates the average rate of change of the mobile laser pulses response with respect of the system ground speed by the equation:

$$MLP(S)' = -2aS + b$$

Wherein, ML" is the first derivative of the polynomial. Second derivative of polynomial is used to calculate the average difference between the rates of change of the tangents lines for each two successive speed unites:

$$M(S)'' = -2a$$

Wherein, ML(″) is the second derivative of the polynomial.

The MLPI(S)″ can be measured by calculating the average of each two sequenced mobile laser pulses response at each two sequenced system ground speeds. The rate of change (average at each sequenced mobile laser pulses) has been concluded by computing the average of each sequenced system ground speed from 16.0 km/h to 16.9 km/h.

The average measured pluses response=Σ[response at speed of value (i+1)+response at speed of value (i+2)]/2.

TABLE 1

The tangent lines can be calculated by averaging each two sequenced calculated mobile laser pulses for each two sequenced speeds.

| Value | Speed km/h (S) | Measured Laser Response (MLR) | Average measured pluses response (rate of change) |
|---|---|---|---|
| 0 | 16.0 | 127291 | 130833 |
| 1 | 16.1 | 133123 | 134853 |
| 2 | 16.2 | 135144 | 137793 |
| 3 | 16.3 | 139271 | 140097 |
| 4 | 16.4 | 144720 | 138373 |
| 5 | 16.6 | 136107 | 134268 |
| 6 | 16.7 | 131174 | 129644 |
| 7 | 16.8 | 126141 | 125998 |
| 8 | 16.9 | 125020 | 124998 |

TABLE 2

Adjustment analysis model for mobile laser beam pulses intensity (MLPI) for speeds 16.0 km/h to 16.9 km/h

| Speed km/h | M (MLPI) | C (MLPI) | Res | Adj_Res | AC (MLPI) |
|---|---|---|---|---|---|
| 16.0 | 127291 | 128564 | −1273 | −862 | 127850 |
| 16.1 | 133123 | 133286 | −162 | 399 | 133815 |
| 16.2 | 135144 | 136622 | −1478 | −879 | 135891 |
| 16.3 | 139271 | 138622 | 649 | 1022 | 139695 |
| 16.4 | 144720 | 139345 | 5375 | 1121 | 140499 |
| 16.6 | 136107 | 136764 | −656 | −517 | 136246 |
| 16.7 | 131174 | 133457 | −2283 | −1444 | 132289 |
| 16.8 | 126141 | 128843 | −2703 | −1878 | 126998 |
| 16.9 | 125020 | 122949 | 2070 | 1931 | 124998 |

The Average Residual=123.14
M (MLPI)=Measured value of Mobile Laser Pulses Intensify
C (MLPI)=Calculated value of value of Mobile Laser Pulses Intensify
Res=Residual [M (MLPI)−C (MLPI)]
Adj_Res=Adjusted residual (Average residual+Residual)
AC=Adjusted calculated value (Calculated+Adj_Res)

The adopted adjustment technique depends mainly on adjusting the residuals (normal least square adjustment). The adjusted residual value is calculated by adding the average residuals to each residual value. Accordingly the adjusted residual is estimated from the calculated value to adjust the calculated value. The same process is repeated to calculate the new residual value. The calculated new residual value is the difference between original measured values and adjusted calculated values. A new mathematical model is created based on the adjusted calculated vales. The model provides a correlation between the calculated speed and the adjusted residual values.

The MLPI (S)" value is calculated by calculating the average of all rates of change values shown in TABLE.1. According to the data provided in TABLE.1, the value of MLPI (S)"=132984. Substituting the values of MLPI (S)" in the polynomial second derivative equation, $$MLPI(S)''=-2a \rightarrow MLPI(S)''=-2a=132984 \rightarrow a=-132984\div2$$

$$a=-66492$$

According to the polynomial first derivative equation (3.2.1)

$$MLPI(S)'=-2aS+b$$

Where MLPI (S)' forms the rate of change of mobile laser pulses responses. Then $$MLPI(S)'=\text{Highest response}-\text{lowes response}$$

$$MLPI(S)'=144720.4-125020=19700.4$$

Using equation 3.1.1.

$$MLPI(S)'=-2\times66492\times16.6+b$$

$$-19700.4=-2\times66492\times16.6+b$$

$$b=-19700.4+(2\times66492\times16.6)$$

b=2187834

Substituting the calculated values of "a" and "b" and the measured values of MLPI at speed 16.6 km/h in the following polynomial equation, $$MLPI(S)=-aS^2+bS-C$$

$$MLPI(S)=-66492\times16.6^2+2187834\times16.6-C$$

$$14722972.32 = -66492 \times 16.6^2 + 2187834 \times 16.6 - C$$

$$c = -175859$$

Thus the final quadratic polynomial equation is.

$$MLPI(S) = -66497 \times S^2 + 2187834 \times S - 17859 \quad 4.1$$

$$R^2 = 094; \text{ fitting regression}|$$

Figure 4:
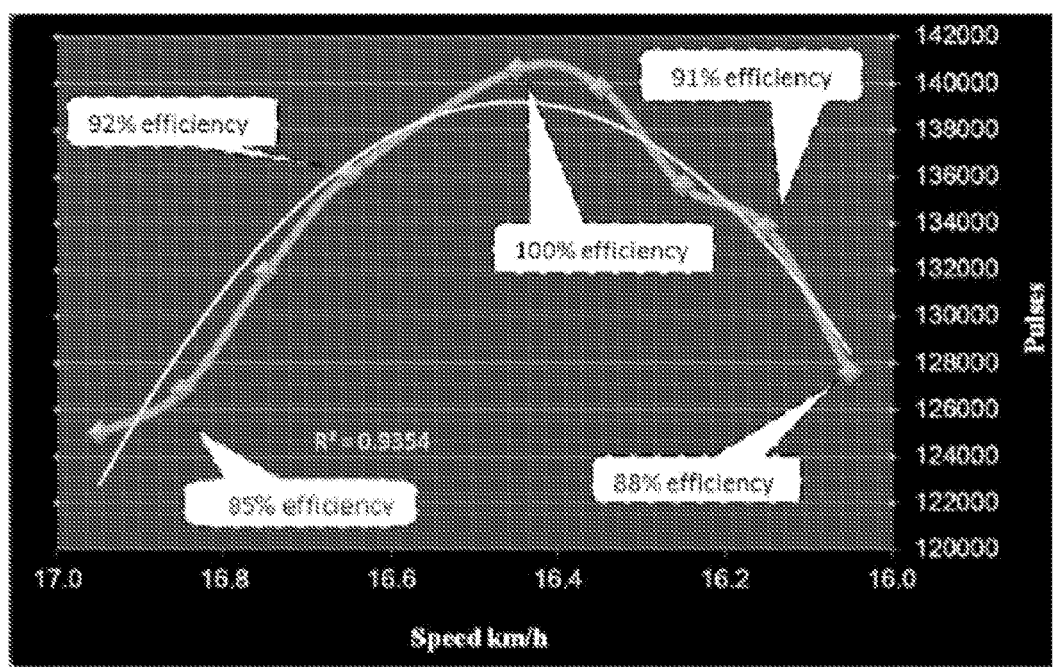
FIG. 4 illustrates a chart indicating a mathematical relationship for the mobile laser beam pulses intensity behavior related to vehicle ground speed units based on a mathematical model for achieving the most efficient mobile laser response in a mobile laser scanning system, according to an embodiment herein.

Using equation 4.1, the measured system ground speed values between 16.0 km/h to 16.9 km/h are calculated using fitting regression model in equation 4.1. The calculated speed values utilized to draw fitting model illustrated in FIG. 4 (smooth curved line). FIG. 4 represents the mathematical relationship for the mobile laser beam pulses intensity behavior related to vehicle ground speed units (16.0, 16.1 . . . 16.9) km/h. The above model shown in FIG. 5 for speed 16 km/h is adjusted to enhance the regression fitting where the mobile laser pulses intensity can be better predicted. The model has been adjusted as per the following analysis.

The regression of the polynomial second order model presents the adjusted mobile laser beam pulses intensity and vehicle ground speed unit's model, where the chi-Square is close to 95.

Technical Overview of Equation in Terms of Calculations

The equation for calculating the speed of the mobile laser system is as follows:

$$S = \frac{Prm \times HLPC}{C}$$

Where Prm is the perimeter of a pipeline and is collected from the site by a visual inspection, HLPC is High Laser Pulse Constant, S is the speed of the mobile unit, and C is a constant.

The HLPC is High Laser Pulse Constant and is calculated by the following steps. At first, all responses of laser pulses observed from the pipeline related speeds are identified. Secondly, all unwanted (error) values due to (laser for dust or laser of objects close to pipeline boundary) are removed to clearly recognize the area where the laser response is totally different. Thirdly, each speed unit is classified with a related laser response. Then the average laser pulse for each speed unit is calculated.

When the ground speed of S=16.49 Km/h, the HLPC value is High Laser Pulse Constant=726.35 and Prm=175 cm, the value of C is calculated from the equation and found to be 7708.38.

Thus the value of HLPC and the value of the constant C is calculated from the field studies and found to be 726.35 and 7708.38 respectively. Hence the speed of the laser mobile unit S is calculated as follows.

$$S = \frac{Prm \times 726.35}{7708.38}$$

Where Prm is the perimeter, which is collected from site by a visual inspection.

The equation for calculating the speed of the mobile laser system is as follows:

$$S = \frac{Prm \times HLPC}{C}$$

Where Prm is the perimeter of a pipeline and is collected from the site by a visual inspection, HLPC is High Laser Pulse Constant, S is the speed of the mobile unit, and C is a constant.

$$\text{Average laser pulse} = \sum_{i=1}^{n} \frac{P_{i+1} + P_{i+2} + P_{i+3} + \ldots + P_n}{n} \quad 4.5$$

Based on the field experiments, the measured value for Perimeter is 175 cm, and the highest laser response for pipeline is 127,111 when the perimeter value is 175 and the related speed is 16.49 substituting these values in the speed calculation equation, $$HLPC = \frac{127,111}{175} = 726.35 \quad 4.5.1$$

This HLPC value (726.35) is the highest possible observed laser response per cm, accordingly the speed equation will be as following:

$$S = \frac{Prm \times HLPC}{C} \quad 4.5.2$$

S: Speed (km/h),
Prm: Perimeter (cm)
HLPC: High Laser Pulse Constant=726.35
Where C (Constant) is needed in order to make the left part equals the right part of the equation. The constant has been calculated using the same equation where the speed, HLPC and Prm values are all known except C value.
S=16.49, HLPC=726.35, Prm=175, C is unknown $$16.49 = \frac{175 \times 726.35}{C}$$

Where, C (Constant)=7708.38

System ground speed, exposed surface (perimeter) of the pipeline and the laser response for the polyethylene material can be mathematically correlated, where laser response for polyethylene materials always constant. However the exposed surface of the pipeline is normally different. Practically the large objects (large exposed surface) are better observed. Then there is a relation between the exposed surface of the polyethylene material and the most efficient system ground speed. The following Equation 4.6 represents the mathematical relationship to identify the most efficient mobile laser scanning mission speed (km/h).

$$S = \frac{Prm \times 726.35}{7708.38} \quad 4.6$$

The equation 4.6 has been validated by recalculating the mobile laser scanning mission and speed limit using the equation and compares it with the collected speed limit. The following TABLE. 3 illustrates the differences between the collected speed limit and laser beam response with the extracted values using the developed equation for both speed limit and laser response.

TABLE 3

| | | Comparison between the measured and calculated (using equation) values | | | |
|---|---|---|---|---|---|
| Original Diameter (cm) | Exposed Pipe Perimeter (cm) | Highest Laser Response (Pulses Calculated) | Avg. Speed (km/h Calculated) | Avg. Speed (km/h Measured) | Aveg. Laser Response (Pulses Measured) |
| 75 | 175 | 127,111.25 | 16.5 | 16.49 | 124,111 |
| 40 | 104.7 | 76,048.35 | 9.9 | 9.4 | 72,365.00 |
| 21 | 55 | 39,949.25 | 5.2 | 4.9 | 37,482.00 |
| 16 | 41.9 | 30,434.07 | 4.0 | 3.6 | 27,876.00 |
| 9.5 | 24.9 | 18,086.12 | 2.3 | 2.2 | 16,655.00 |

The mathematical relationship is a linear relationship, and is represented as follows:

$$f(x) = aX + b \qquad 4.7$$

Where Y is the measured speed, X is the calculated speed, a & b are constants.

The derivative of the linear equation for calculated system speed with respect to measured system speed reflects the rate of change of the calculated system speed with respect to measured system speed as given below.

$$S_M = aS_C + b \qquad 4.7$$

Where $S_M$ is stands for (Measured Speed); $S_C$ is stands for (Calculated Speed) a and b are coefficients Then a Linear derivative of the equation is $$(S_M)' = a \qquad 4.7.1$$

The $(S_M)'$ can be measured by calculating the average rate of change of the measured speed (16.49, 9.4, 3.6, 2.2) km/h with respect to the calculated system speed. The average calculated value for $(S_M)'$ is found to be 1.0124
a = 1.0124
Using linear equation (4.7)

$$S_M = aS_C + b$$

$$S_M = aS_C + b$$

$$16.49 = 1.0124 \times 16.5 + b$$

$$b = -0.28345;$$

→b when calculated speed is 16.5 km per h, the same equation utilized to calculate the b value for the other calculated speed values (9.9, 5.2, 3.9, 2.3)
The average b value for measured and calculated speeds presents the $$b = -0.378$$

Thus the final quadratic polynomial equation is $$S_M = aS_C + b$$

$$S_M = 1.0124 S_C - 0.378 \qquad 4.8$$

$R^2 = 0.99$: (fitting regression)

Figure 7:
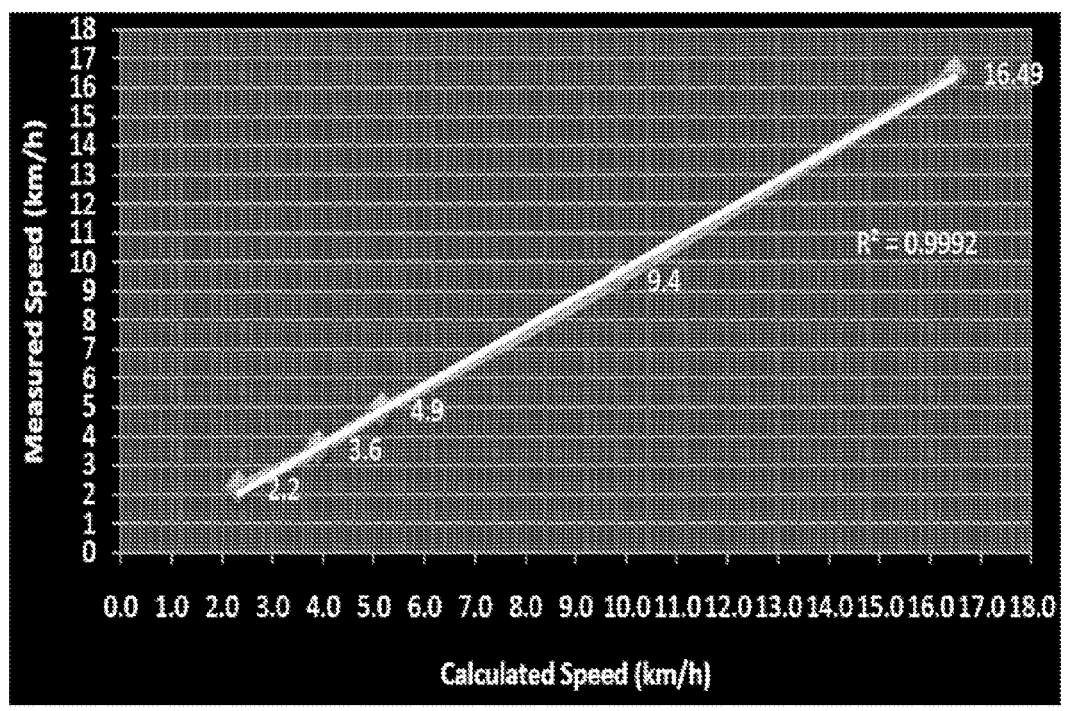
FIG. 7 illustrates a chart indicating the mathematical relationship between the measured system speed and the calculated system speed using a regression model in a method for generating the mathematical model for achieving the most efficient mobile laser response, according to an embodiment herein.

Using equation 4.8, the measured system speed values and the calculated system speed regression model is R2=0.99 as illustrated in FIG. 7 (white line).

Analysis of Generated 3D Surface Model

Figure 8:
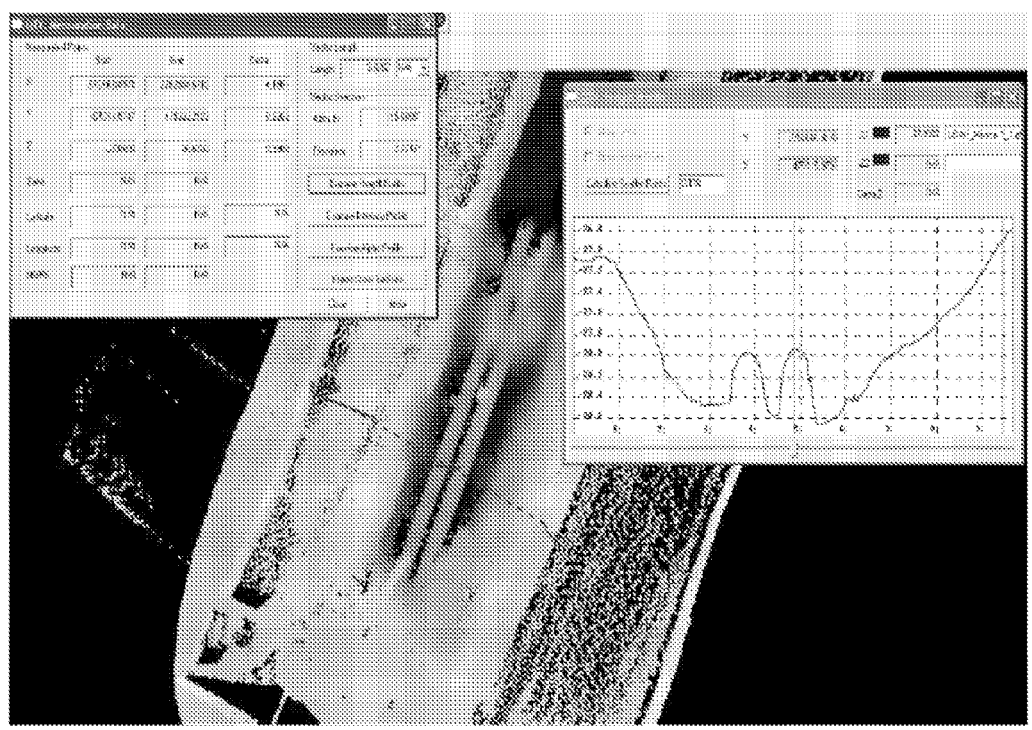
FIG. 8 illustrates a cross section of the scanned district cooling pipes using a mobile leaser scanning method according to an embodiment herein.
Figure 9:
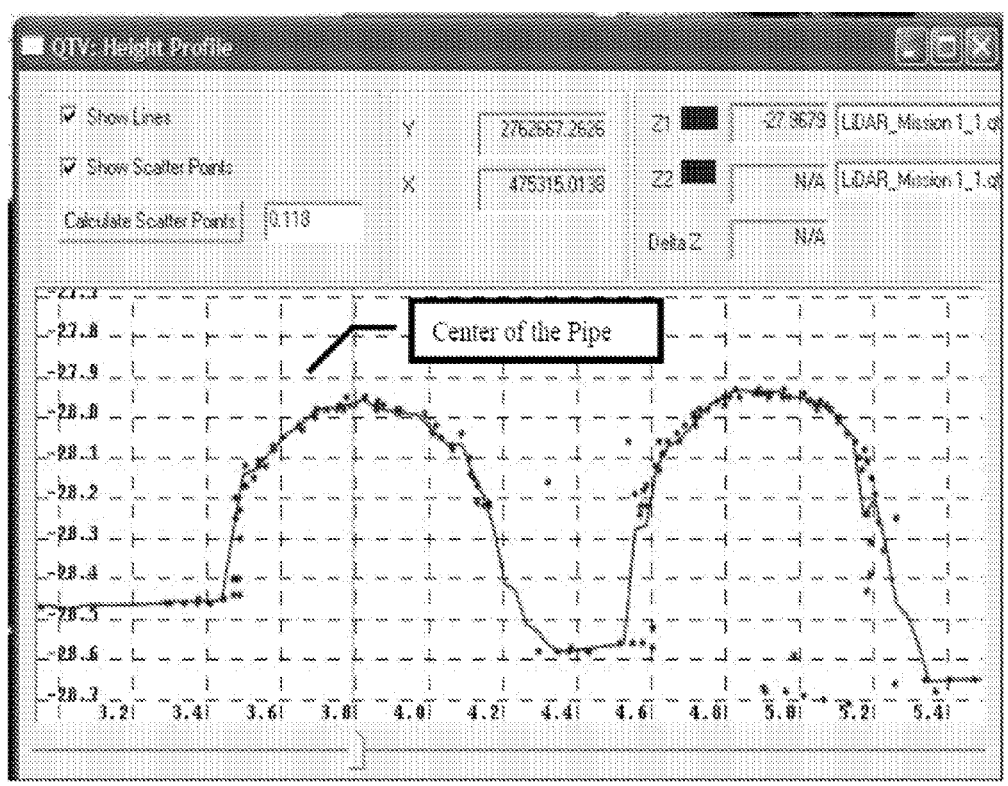
FIG. 9 illustrates a detailed height profile analysis of the scanned district cooling pipes using a mobile leaser scanning method according to an embodiment herein.

FIG. 8 shows the experimental data of the utilization of the mobile laser scanning system after conducting the geometrical corrections and post processing activities. FIG. 8 and FIG. 9 present the capability of the system in monitoring the infrastructure network locations and primary significant specifications such shape, diameter and location. The FIG. 8 shows the cross section of the scanned district cooling pipes.

FIG. 9 shows that the exposed shape of the pipes where the beneath part of the pipes are not shown. The pipe diameters can be extracted from the cross section is shown in FIG. 9; where the pipe diameter is 0.6 m.

The horizontal location of any part of the pipe is also extractable due to the generated 3D surface model. The location of the center of the right pipe is calculated using local projection parameters Dubai Local Transverse Mercator (DLTM) 475315 E and 2762667.3 N. The depth/elevation can be calculated only if we have Geoid undulation value. The Geoid undulation value at the center of the pipe is 34.3 m where the Orthometric height is 27.97 (Ellipsoidal height)−34.3 (Geoid undulation)=6.3 m (Orthometric height).

The surveying positional accuracy is the base of utilization the mobile/mobile laser scanning technology. Another mobile laser scanning mission conducted to verify the observed outcomes in the sense of observed city objects and the validity of the system integration unit with the GNSS/GPS reference stations.

Infrastructure Overhead Cables Extraction

Figure 10:
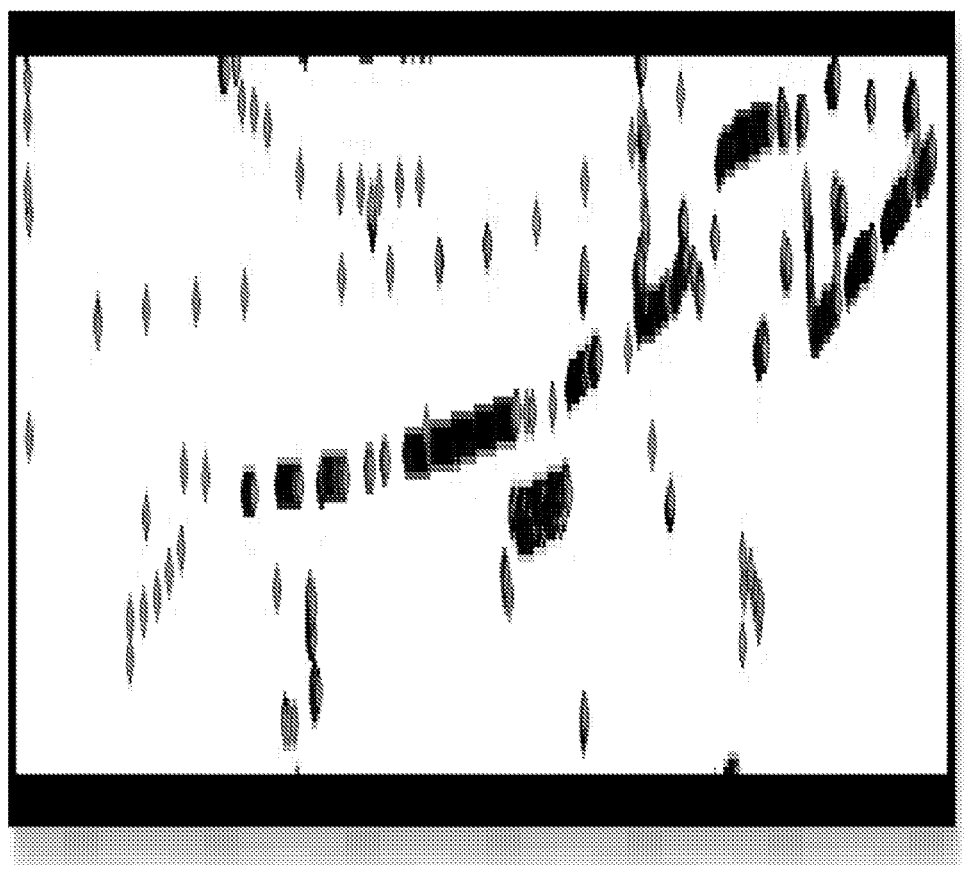
FIG. 10 illustrates a segregated overhead line laser points based on altitude interval values obtained during an extraction of overhead cables in mobile leaser scanning method according to an embodiment herein.
Figure 11:
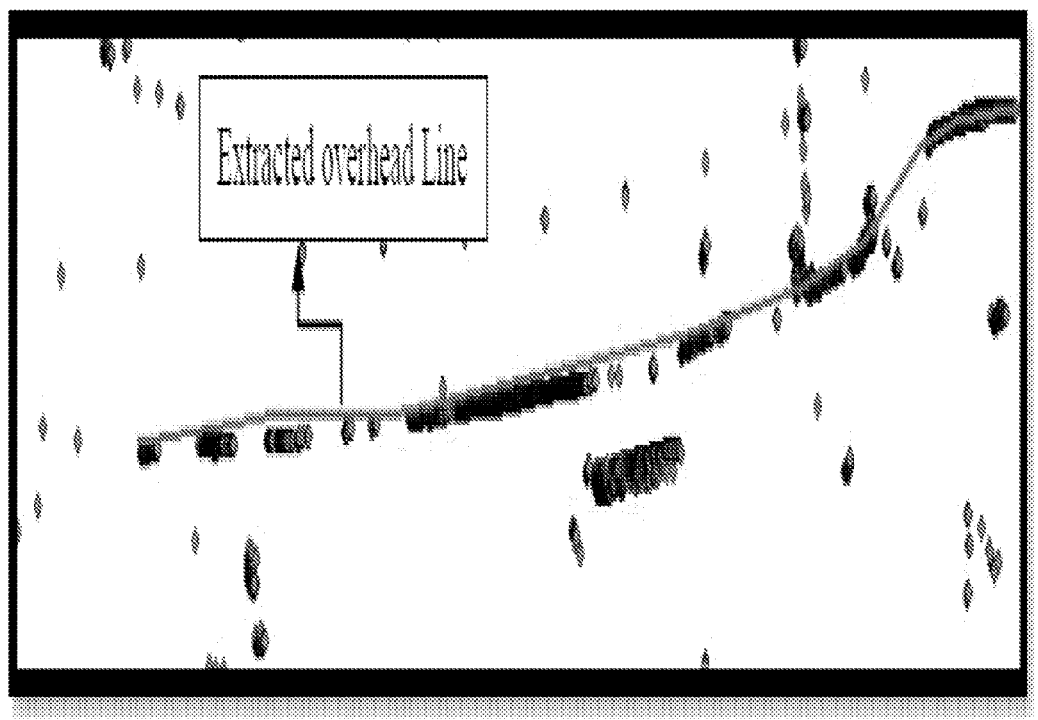
FIG. 11 illustrates the extracted over head line laser points based on altitude interval values obtained during an extraction of over head cables in mobile leaser scanning method according to an embodiment herein.

The extraction of the overhead cables conducted the same data filtration process. The overhead cables altitude interval values extracted from the 3D surface model, where the shape file filtered accordingly. FIG. 10 presents the matched laser point, FIG. 11 shows the extracted overhead line and FIG. 12 reflects the actual 3D model overhead line. In order to verify the capabilities of the mobile laser scanning system in the infrastructure networks, third mobile laser scanning mission has been conducted to verify the system practicality with the infrastructure networks. The mission planned to reflect most of the pipe sizes that are currently used in reflecting the infrastructure networks. The tested pipe sizes starts from the irrigation pipes (25 mm), water distribution pipes (95 mm, 160 mm, 210 mm) and water transmission (400 mm)

The bigger pipes sizes considered as detectable pipes assume that the smaller pipe sizes are already recognizable. The pipes are chosen to be monitored by the mobile scanner due to its shape that can be generalized for all kind of networks. Different pipes diameters are collected together to be scanned using the mobile scanner. These pipes diameters are almost covering the features thicknesses for power and water facilities for both perspectives distribution and transmission networks. The surface has been chosen to be as actual physical site conditions in order to study the overall positional accuracy of the integrated systems with respect to surveyed features. Two factors are considered during the mobile laser-scanning mission, the first factor is to accumulate all study pipe sizes together. Collecting all pipe sizes together would facilitate the ability to study all laser beam behaviors on the movable mode.

The adopted adjustment technique depends mainly on adjusting the residuals (normal least square adjustment); where the adjusted residual has been calculated by adding the average residuals to each residual value. Accordingly the adjusted residual will be dedicated from calculated value to adjust the calculated value. The same process has been implemented to calculate the new residual; where the new residual will be the difference between original measured values and adjusted calculated values. The new model has been created based on the adjusted calculated vales. The model correlation has been created between the calculated speed and the adjusted residual values.

The equation for calculating the speed of the mobile laser system is as follows:

$$S = \frac{Prm \times HLPC}{C}$$

Where Prm is the perimeter of a pipeline and is collected from the site by a visual inspection, HLPC is High Laser Pulse Constant, S is the speed of the mobile unit, and C is a constant.

The HLPC is High Laser Pulse Constant and is calculated by the following steps. At first, all responses of laser pulses observed from the pipeline related speeds are identified. Secondly, all unwanted (error) values due to (laser for dust or laser of objects close to pipeline boundary) are removed to clearly recognize the area where the laser response is totally different. Thirdly, each speed unit is classified with a related laser response. Then the average laser pulse for each speed unit is calculated.

When the ground speed of S=16.49 Km/h, the HLPC value is High Laser Pulse Constant=726.35 and Prm=175 cm, the value of C is calculated from the equation and found to be 7708.38.

Thus the value of HLPC and the value of the constant C is calculated from the field studies and found to be 726.35 and 7708.38 respectively. Hence the speed of the laser mobile unit S is calculated as follows.

$$S = \frac{Prm \times 726.35}{7708.38}$$

Where Prm is the perimeter, which is collected from site by a visual inspection.

The system ground speed, exposed surface (perimeter) of the pipeline and the laser response for the polyethylene material can be mathematically correlated, where laser response for polyethylene materials always constant. However the exposed surface of the pipeline is normally different. Practically the large objects (large exposed surface) are better observed. Then there is a relation between the exposed surface of the polyethylene material and the most efficient system ground speed. The above Equation represents the mathematical relationship to identify the most efficient mobile laser scanning mission speed (km/h).

FIG. 1 illustrates a method for utilizing mobile laser scanning mission, according to an embodiment herein. The method for performing mobile laser scanning process (101) comprises the steps of: collecting relevant permissions prior to start the process (102); starting the process (103) by verifying of all the components of the laser scanning system i.e. vehicle readiness verification (104a), scanner readiness verification (104b), IMU and GPS readiness verification (104c), data logging readiness verification (104d), GNSS station/GPS base station readiness verification (104e), System initialization readiness verification (104f) for their functionality; performing real data validation of the laser scanning system (105); conducting mobile laser scanning by sending the laser pulses and collecting data from the reflected laser pulses (107); correcting the geometrical errors in mobile laser scanning point cloud data using GNSS reference station data (108); generating LAS file by combining surveyed laser data and GNSS data (109); constructing 3D surfaced based model by using the data from LAS file (110); analyzing the surface model and extracting the layout of polyethylene infrastructure structures (111); and observing the diameter, shape extent of the polyethylene pipes using the cross sections of the layout (112).

Figure 2:
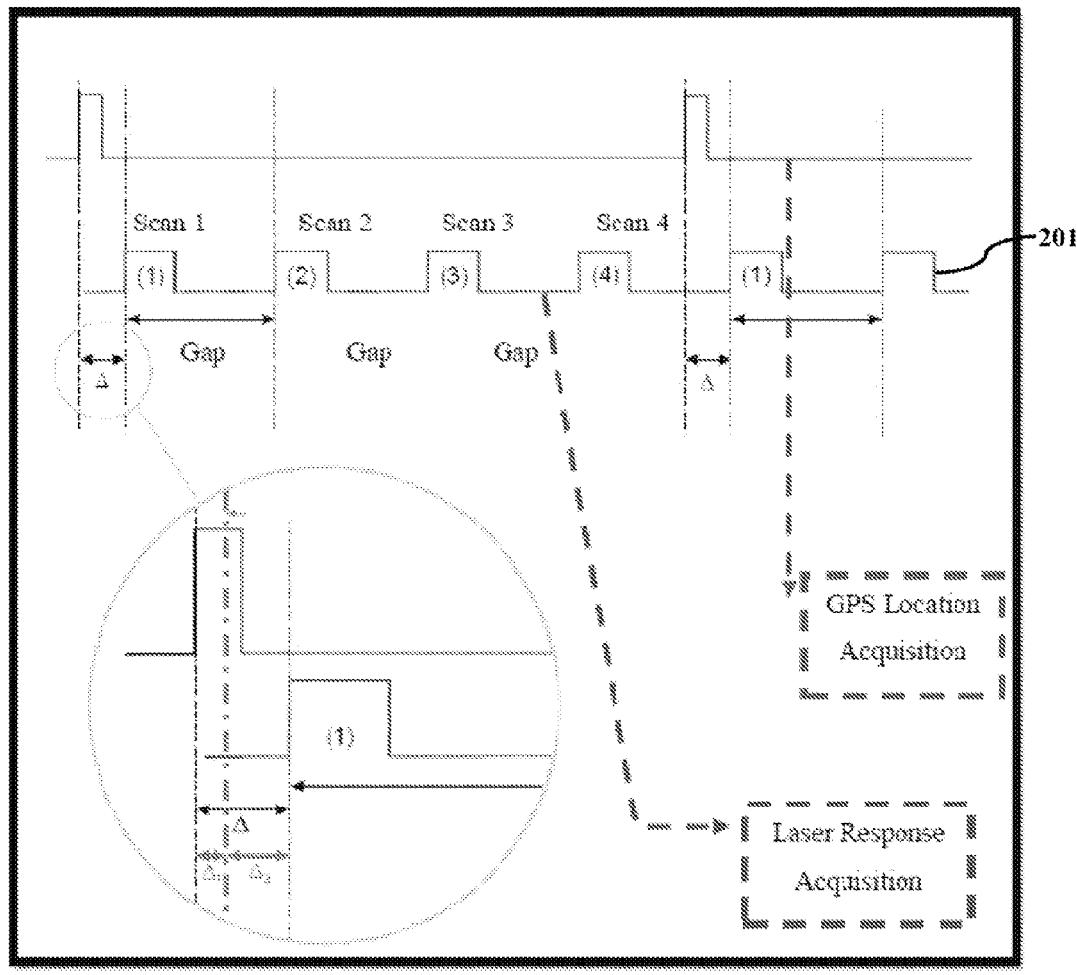
FIG. 2 illustrates a timing chart used in a method for synchronizing GPS location acquisition with mobile laser response, according to an embodiment herein.

FIG. 2 illustrates a method for synchronizing GPS location acquisition with mobile laser response, according to an embodiment herein. The behavior of the mobile laser system for the polyethylene materials receives 200 pulses (201) per second in positive and negative directions; wherein the system records the frame ground speed every 0.02 second. Accordingly there is a gap between the recorded mobile laser pulses (record every 0.005 second) and the frame ground speed (record every 0.02 second). The mobile laser pulses are grouped, filtered and averaged from 0.005 to 0.02 seconds in order to compare the frame ground speed with the mobile laser pulses response at the same point of time. The positivity and negativity of the received mobile laser beam pulses represents the laser beam direction; accordingly all negative values are transferred to absolute values prior to conduct the analytical analysis.

Figure 3:
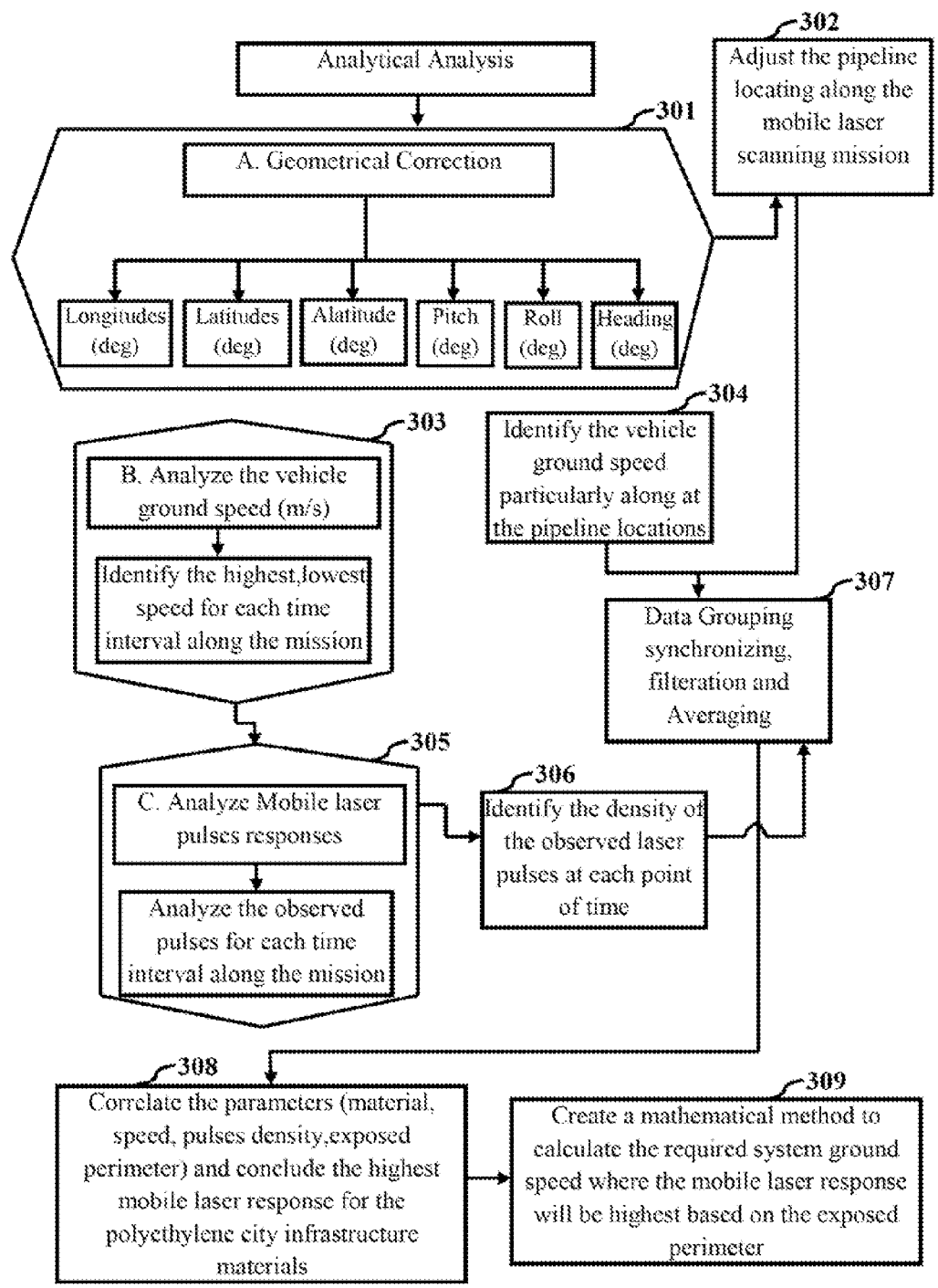
FIG. 3 illustrates a flow chart indicating a method for generating the mathematical model for achieving the most efficient mobile laser response, according to an embodiment herein.

FIG. 3 illustrates a workflow for the mathematical model for achieving the most efficient mobile laser response, according to an embodiment herein. The accurate time series identification is significantly related to the accuracy of identifying the polyethylene location (latitudes and longitudes), field mission locations and the IMU orientation angles (roll, pitch and heading) (301). The geometrical correction of the IMU orientation angles are related to the geometrical correction of the system reference frame. The system reference frame is geometrically corrected using the input correction combined from the GNSS reference station (302). The method records the frame ground speed and identifies the highest speed and the lowest speed for each time interval (303). The system ground speed is identified along the pipeline locations (304). The IMU observation is analyzed to interpret the mobile laser beam pulses intensity (varies from material to another) (305) and density (varies from speed limit to another) at each point of time (306). The timing observation is used to correlate the mobile laser pulses, location (latitudes and longitudes) and system ground speed with respect to time. The mobile laser pulses are grouped, filtered and averaged in order to compare the frame ground speed with the mobile laser pulses response at the same point of time (307). The method uses correlation between the system ground speed and the mobile laser response to conclude the highest mobile laser response constant for scanning the polyethylene infrastructure networks (308). The exposed pipeline perimeter using physical measurement and the laser response per centimeter for the polyethylene materials are known; accordingly the most efficient system ground speed is calculated using the mathematical method (309).

FIG. 4 illustrates a chart indicating a mathematical relationship for the mobile laser beam pulses intensity behavior related to vehicle ground speed units based on a mathematical model for achieving the most efficient mobile laser response in a mobile laser scanning system, according to an embodiment herein. The measured system ground speed values between 16.0 km/h to 16.9 km/h are calculated using fitting regression model represented by the following equation $$MLPI(S) = -66497 \times S^2 + 2187834 \times 17859 \quad 4.1$$

$R^2 = 0.94$: (fitting regression)

Figure 5:
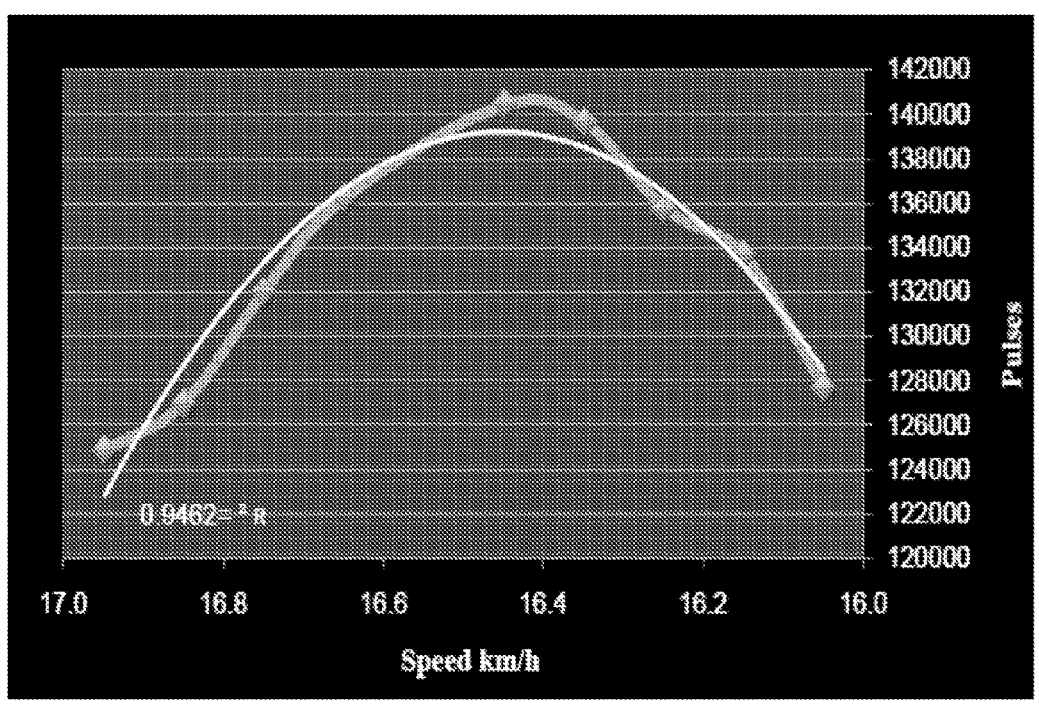
FIG. 5 illustrates a chart indicating a mathematical relationship for the mobile laser beam pulses intensity behavior related to vehicle ground speed units based on an adjusted mathematical model for achieving the most efficient mobile laser response in a mobile laser scanning system, according to an embodiment herein.

The calculated speed values utilized to draw fitting model illustrated in FIG. 4 (smooth curved line). The FIG. 4 represents the mathematical relationship for the mobile laser beam pulses intensity behavior related to vehicle ground speed units (16.0, 16.1 . . . 16.9) km/h FIG. 5 illustrates a chart indicating a mathematical relationship for the mobile laser beam pulses intensity behavior related to vehicle ground speed units based on an adjusted mathematical model for achieving the most efficient mobile laser response in a mobile laser scanning system, according to an embodiment herein. The mathematical model shown in FIG. 5 for speed 16 km/h is adjusted to enhance the regression fitting where the mobile laser pulses intensity can be better predicted. The model has been adjusted as per the following analysis. The regression of the polynomial second order model presents the adjusted mobile laser beam pulses intensity and vehicle ground speed unit's model, where the chi-Square is close to 95%.

Figure 6:
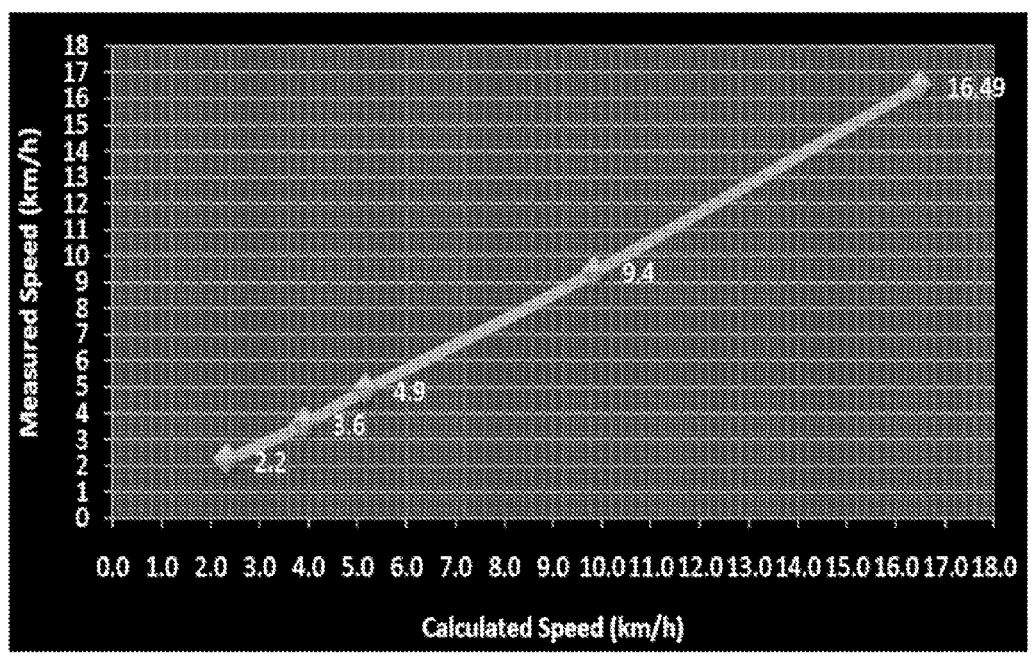
FIG. 6 illustrates a chart indicating the mathematical relationship between the measured system speed and the calculated system speed in a method for generating the mathematical model for achieving the most efficient mobile laser response, according to an embodiment herein.

FIG. 6 illustrates a chart indicating the mathematical relationship between the measured system speed and the calculated system speed in a method for generating the mathematical model for achieving the most efficient mobile laser response, according to an embodiment herein. With respect to FIG. 6, the equation $$S = \frac{Prm \times 726.35}{7708.38}$$

has been validated by recalculating the mobile laser scanning mission and speed limit using the equation and compares it with the collected speed limit FIG. 7 illustrates a chart indicating the mathematical relationship between the measured system speed and the calculated system speed using a regression model in a method for generating the mathematical model for achieving the most efficient mobile laser response, according to an embodiment herein. The measured system speed values and the calculated system speed using the equation $$S_M = aS_C + b$$

$$S_M = 1.0124 S_C - 0.378 \quad 4.8$$

$R^2 = 0.99$: (fitting regression)
and regression model is R2=0.99 as illustrated in FIG. 7 (front line).

FIG. 8 illustrates a cross section of the scanned district cooling pipes using a mobile leaser scanning method according to an embodiment herein, while FIG. 9 illustrates a detailed height profile analysis of the scanned district cooling pipes using a mobile leaser scanning method according to an embodiment herein. FIG. 8 and FIG. 9 shows the details acquired by the utilization of the mobile laser scanning system after conducting the geometrical corrections and post processing activities. FIG. 8 and FIG. 9 present the capability of the system in monitoring the infrastructure network locations and primary significant specifications such shape, diameter and location.

The FIG. 8 shows the cross section of the scanned district cooling pipes. FIG. 9 shows that the exposed shape of the pipes where the beneath part of the pipes are not shown. The pipe diameters can be extracted from the cross section as shown in FIG. 9, where the pipe diameter is 0.6 m.

The horizontal location of any part of the pipe is also extractable due to the generated 3D surface model. The location of the centre of the right pipe is calculated using local projection parameters Dubai Local Transverse Mercator (DLTM) 475315 E and 2762667.3 N. The depth/elevation can be calculated only if we have Geoid undulation value. The Geoid undulation value at the centre of the pipe is 34.3 m where the Orthometric height is 27.97 (Ellipsoidal height)−34.3 (Geoid undulation)=6.3 m (Orthometric height).

The surveying positional accuracy is the base of utilization the mobile/mobile laser scanning technology. Another mobile laser scanning mission conducted to verify the observed outcomes in the sense of observed city objects and the validity of the system integration unit with the GNSS/GPS reference stations.

Figure 12:
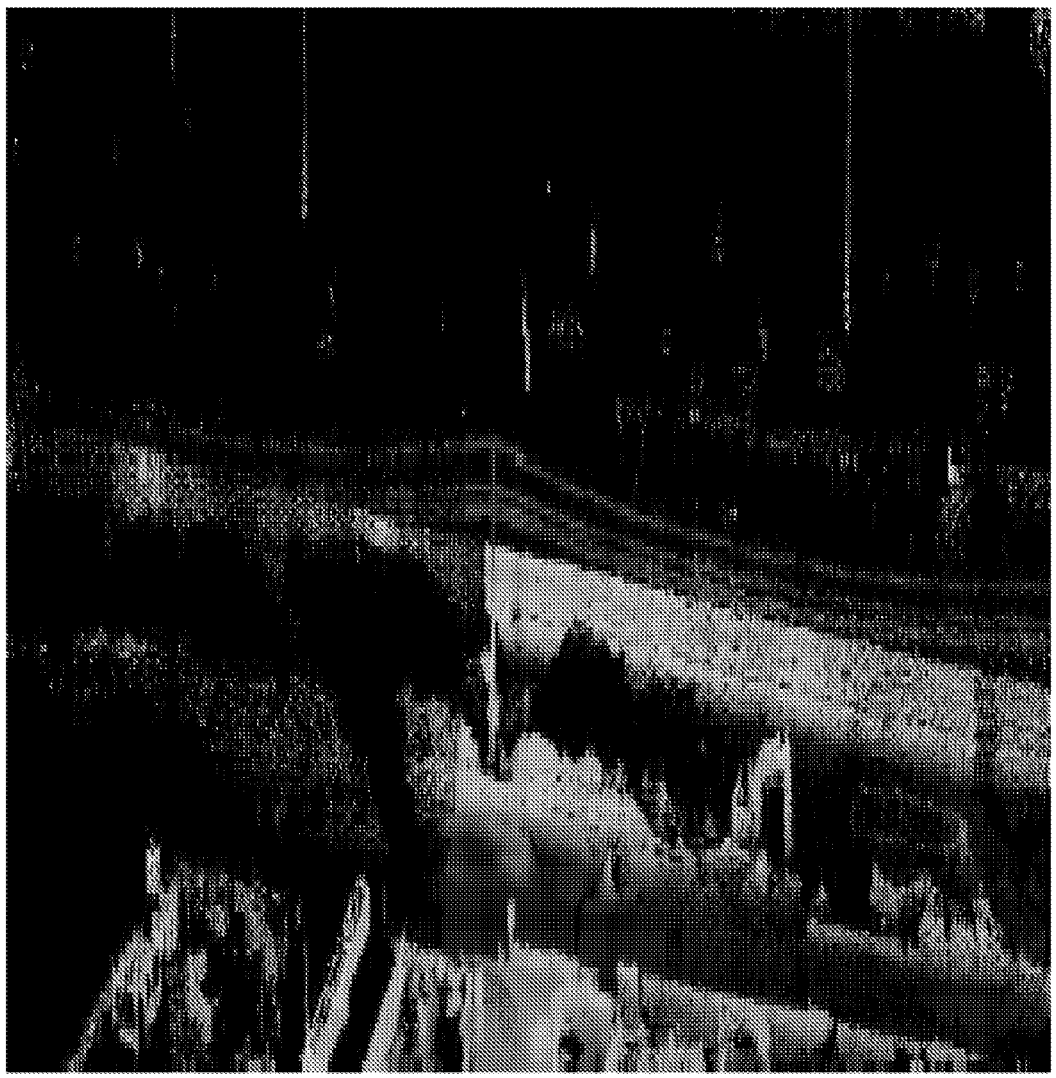
FIG. 12 illustrates a schematic representation of an overhead line in a 3D surface model, during an extraction of overhead cables in mobile leaser scanning method according to an embodiment herein.

FIG. 10 illustrates a segregated overhead line laser points based on altitude interval values obtained during an extraction of over head cables in mobile leaser scanning method according to an embodiment herein, while FIG. 11 illustrates the extracted over head line laser points based on altitude interval values obtained during an extraction of over head cables in mobile leaser scanning method according to an embodiment herein and FIG. 12 illustrates a schematic representation of an over head line in a 3D surface model, during an extraction of over head cables in mobile leaser scanning method according to an embodiment herein.

The overhead cables altitude interval values are extracted from the 3D surface model, where the shape-file is filtered accordingly. FIG. 10 presents the matched laser point, FIG. 11 shows the extracted overhead line and FIG. 12 reflects the actual 3D model overhead line. In order to verify the capabilities of the mobile laser scanning system in the infrastructure networks, third mobile laser scanning mission has been conducted to verify the system practicality with the infrastructure networks. The mission planned to reflect most of the pipe sizes that are currently used in reflecting the infrastructure networks. The tested pipe sizes starts from the irrigation pipes (25 mm), water distribution pipes (95 mm, 160 mm, 210 mm) and water transmission (400 mm)

The bigger pipes sizes considered as detectable pipes assume that the smaller pipe sizes are already recognizable. The pipes are chosen to be monitored by the mobile scanner due to its shape that can be generalized for all kind of networks. FIG. 4.58 shows different pipes diameters collected together to be scanned using the mobile scanner. These pipes diameters are almost covering the features thicknesses for power and water facilities for both perspectives distribution and transmission networks. The surface has been chosen to be as actual physical site conditions in order to study the overall positional accuracy of the integrated systems with respect to surveyed features. Two factors are considered during the mobile laser scanning mission, the first factor is to accumulate all study pipe sizes together. Collecting all pipe sizes together would facilitate the ability to study all laser beam behaviours on the movable mode.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A method for analyzing mobile laser response using a mathematical model, the method comprising the steps of:
    analyzing IMU observation observed using a floating or unfixed inertial measurement unit (IMU), to interpret intensity and density of mobile laser pulses at a given time;
        wherein the inertial measurement unit (IMU) calculates orientation angles of laser emitter components fixed inside a scanning or navigation and orientation box;
    correlating the mobile laser pulses, location including latitudes and longitudes and system ground speed through the timing observation;
    using a Global Positioning System (GPS), for identifying and calculating a location including latitudes and longitudes and position of a mobile laser scanning system;
    using a mobile laser system for:
        recording the mobile laser pulses, location including latitudes and longitudes and system ground speed with respect to time;
        identifying a time interval;
        identifying a system ground speed at noted time interval, laser response at each point of time and ground speed unit;
        estimating a highest mobile laser response constant for scanning the polyethylene infrastructure networks using correlation data between the system ground speed and the mobile laser response; and
        calculating a system ground speed by using exposed pipeline perimeter and a laser response per centimeter for the polyethylene materials,
    wherein the system ground speed of the laser mobile unit S is calculated using an equation $$S = \frac{Prm \times 726.35}{7708.38}$$

where Prm is the perimeter, and a value of the perimeter is collected from site by a visual inspection.

2. The method according to claim 1, wherein a suitable system ground speed to be conducted during the mobile laser scanning missions for pipelines or cables is identified.

3. The method according to claim 1, interprets the mobile laser scanning behaviour with respect to polyethylene infrastructure networks and accordingly identifies the mobile laser response.

4. A system for obtaining geospatial data on infrastructure networks, the system comprising:
    a mobile laser scanner, for conducting a mobile laser scanning process by sending laser pulses, recording mobile laser pulses and collecting a data from the reflected laser pulses;
    a vehicle equipped with Global Positioning System (GPS), for identifying and calculating a location including latitudes and longitudes and position of a mobile laser scanning system;
    a floating/unfixed inertial measurement unit IMU, for calculating orientation angles of laser emitter components fixed inside a scanning or navigation or orientation box and to interpret mobile laser beam pulses intensity and density at a given time by analysing IMU observations; and
    one or more CCD cameras;
    wherein the mobile laser scanners are mounted on top of the vehicle and wherein the mobile laser scanners are integrated with navigation and orientation platforms.

5. The system according to claim 4, wherein the orientation and location of the mobile laser scanning system is adopted for defining the system position and direction, during the system movement in at-least three directions, and wherein the directional accuracy enhances the smoothness of receiving the laser pulses reflects.

6. The system according to claim 4, wherein the system is checked before conducting any physical laser scanning mission due to the high system sensitivity.

7. The system according to claim 4, wherein the IMU navigation unit, data logging configuration, the readiness of the vehicle and all related configuration are checked before conducting the mobile laser scanning mission.

8. The system according to claim 4, wherein the surveying system is immediately initiated once the position is identified and calculated using the GPS.

9. The system according to claim 4, wherein the system is oriented to monitor the polyethylene infrastructure networks, and wherein the polyethylene infrastructure data update is developed by verifying the exposed portion of the polyethylene pipelines or cables, route and the 3D location.

10. The system according to claim 4, wherein the monitoring of the polyethylene infrastructure networks are measured by utilizing the cross sections profiles of the polyethylene pipelines or cables.

* * * * *